P. N. JONES.
PASSENGER CAR.
APPLICATION FILED AUG. 1, 1912.

1,096,174.

Patented May 12, 1914.
4 SHEETS—SHEET 1.

WITNESSES

INVENTOR

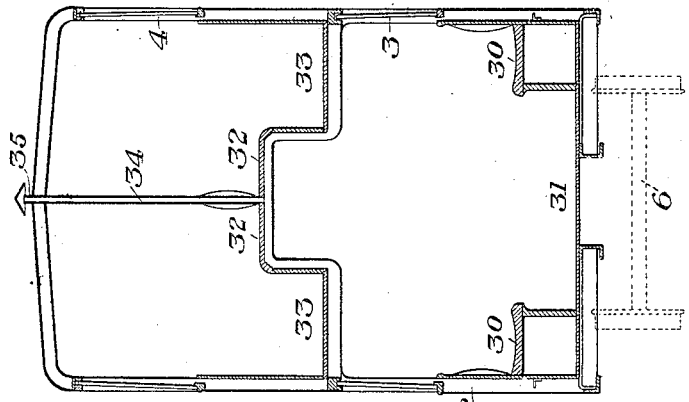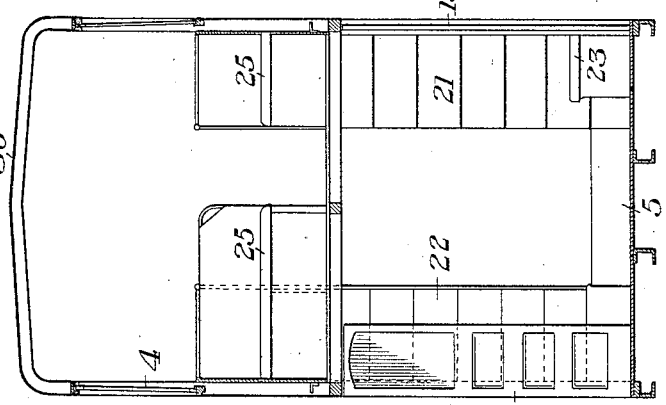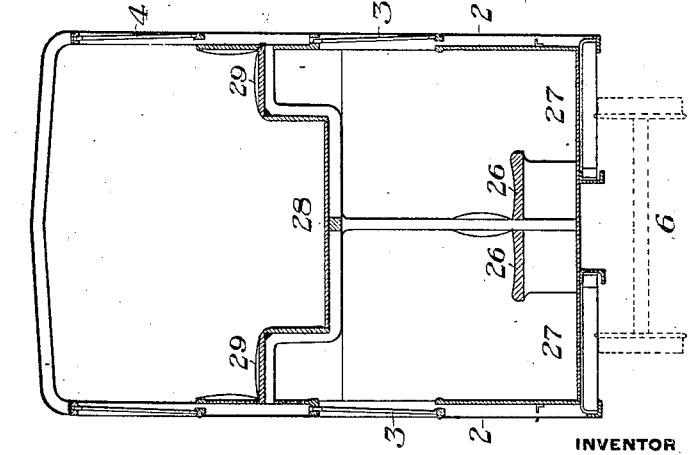

P. N. JONES.
PASSENGER CAR.
APPLICATION FILED AUG. 1, 1912.
1,096,174.
Patented May 12, 1914.
4 SHEETS—SHEET 3.
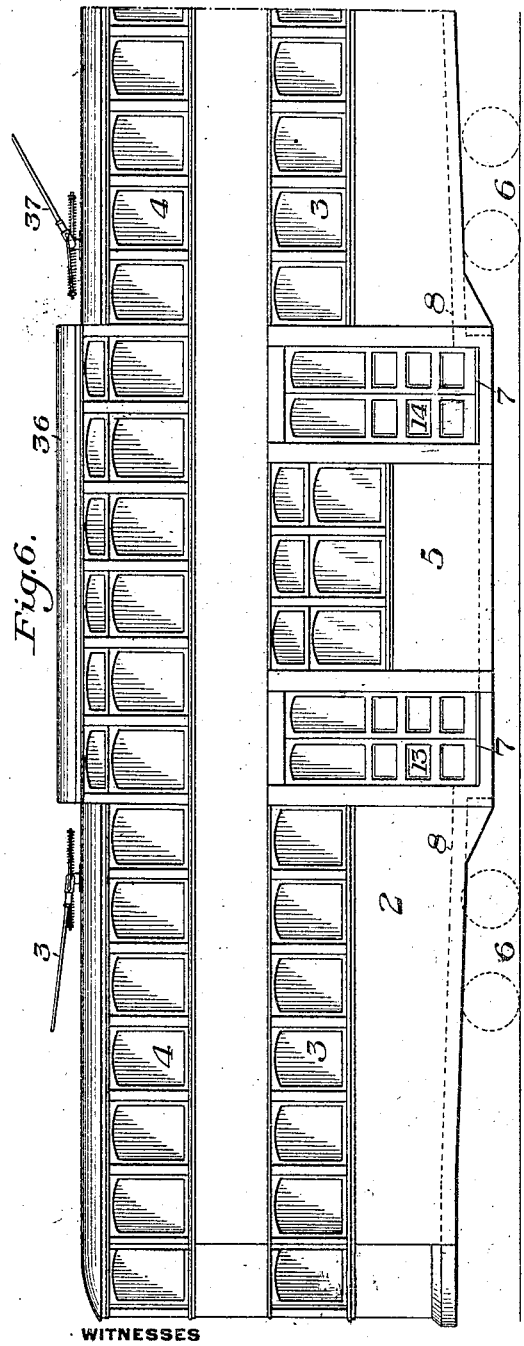
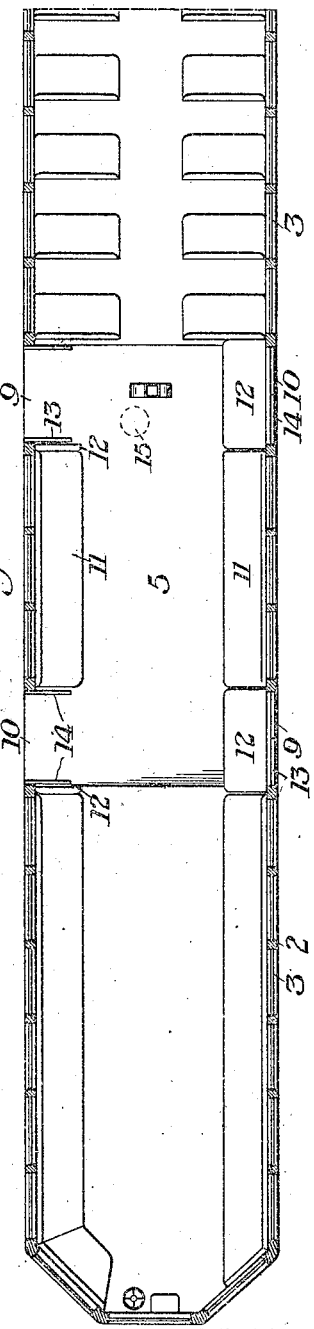

P. N. JONES.
PASSENGER CAR.
APPLICATION FILED AUG. 1, 1912.
1,096,174.
Patented May 12, 1914.
4 SHEETS—SHEET 4.
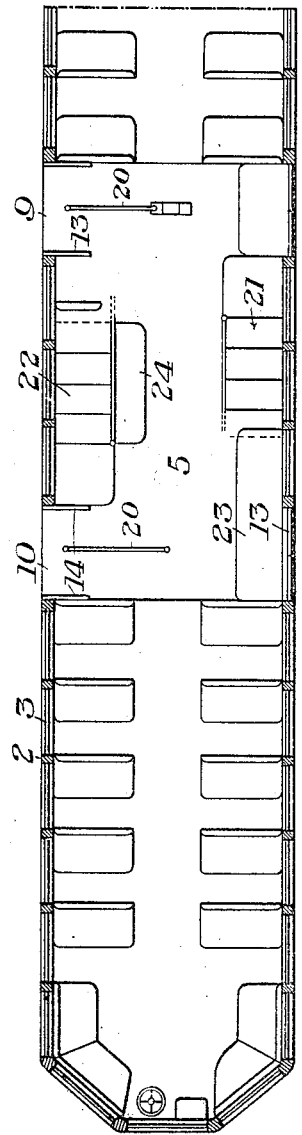
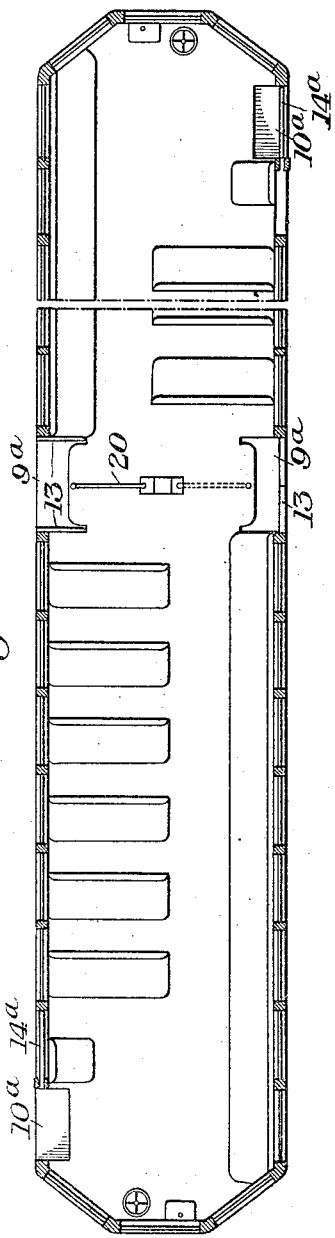

UNITED STATES PATENT OFFICE.

PEARL N. JONES, OF PITTSBURGH, PENNSYLVANIA.

PASSENGER-CAR.

1,096,174.  Specification of Letters Patent.  Patented May 12, 1914.

Application filed August 1, 1912. Serial No. 712,729.

*To all whom it may concern:*

Be it known that I, PEARL N. JONES, a resident of Pittsburgh, in the county of Allegheny and State of Pennsylvania, have invented a new and useful Improvement in Passenger-Cars, of which the following is a full, clear, and exact description, reference being had to the accompanying drawings, forming part of this specification, in which—

Figure 1:
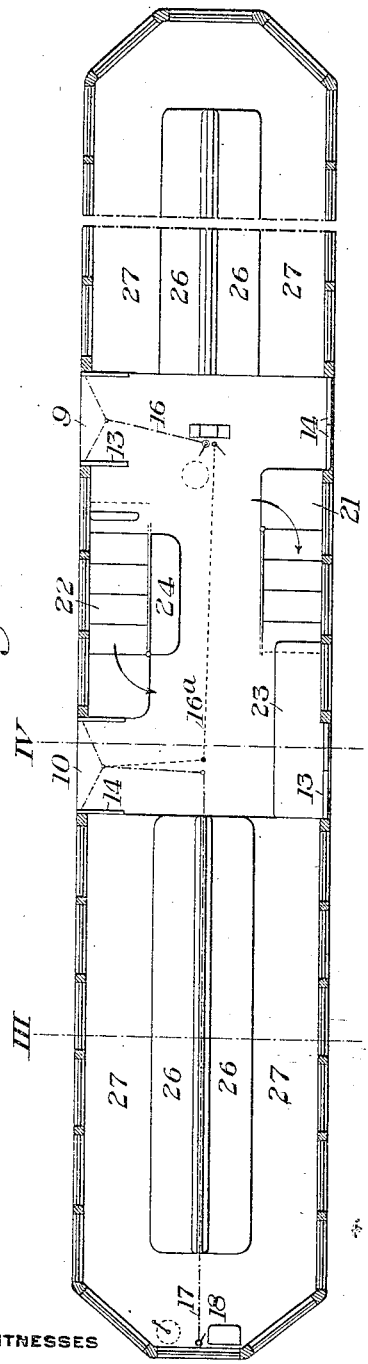
Figure 2:
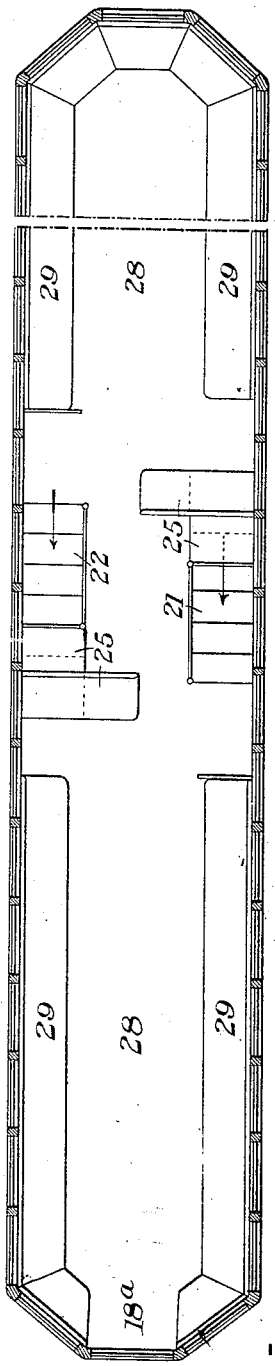

Figure 1 is a floor plan of the lower deck of a double-deck passenger car, embodying my invention; Fig. 2 is a similar view of the upper deck; Figs. 3 and 4 are sections taken, respectively, on the lines III—III and IV—IV of Fig. 1; Fig. 5 is a view similar to Fig. 3, but showing a modification; Fig. 6 is a side elevation of a portion of a double-deck car embodying my invention; Fig. 7 is a partial plan view of a single-deck car embodying features of my invention; and Figs. 8 and 9 are diagrammatic plan views illustrating different arrangements of the seats and of the exit and entrance doors.

My invention has relation to passenger cars, and more particularly to what are commonly known as "street" cars.

One object of my invention is to provide a car having a novel arrangement of its exit and entrance passages, whereby the incoming and outgoing passengers will not only be separated and prevented from interfering with each other within the car, but which will also separate the entering and alighting passengers exteriorly of the car on the street. In central side entrance cars, as heretofore used, the entrance and exit passages have been closely adjacent to each other, and there has been interference between the incoming and outgoing passengers within the car, due to the crowding of incoming passengers adjacent the exit opening and of outgoing passengers adjacent the entrance opening. My invention is designed to overcome this; and this feature of my invention is applicable to both single and double-deck cars.

My invention also provides a car in which the responsibility of looking after the passengers may, if desired, be divided between the motorman and the conductor. The increasing size of street cars has increased the work on the crew, and in cars having a single door or adjacent doors for entrance and exit, that member of the crew (motorman or conductor) who looks after the operation of the doors in addition to performing his ordinary duties, has more than half the work to perform, resulting in loss of time and delay to schedule. In cars of the center entrance and exit type, the conductor usually has too much to look after, since he is required to look after both the entering and alighting passengers and to control both the entrance and exit doors. In cars constructed in accordance with my invention, this work may be divided, and while the conductor retains control of the entrance doors and entering passengers, collecting fares, etc., the motorman can be given control of the exit doors. This feature of my invention is also applicable to both single and double-deck cars.

A further object of my invention is to provide a double-deck car of novel construction, which will have a maximum seating capacity.

A still further object is to provide a double-deck car which will be of minimum height, so as to readily pass under existing overhead structures; and to provide a car of this type having an arrangement of stairways which will encroach as little as possible upon the seating space of the car and which are conveniently located with reference to the exit and entrance openings.

Another object of this invention is to provide for the symmetrical arrangement of entrance and exit openings and stairways in a shorter space, without passenger interference, thereby reducing the length of the depressed portion of the car body.

Other objects of my invention will hereinafter appear.

Referring to the accompanying drawings, in which I have illustrated my invention, the numeral 2 designates the side of the car which, in the double-deck form, may be provided with the usual lower windows 3 and also with the upper windows 4. The central portion 5 of the car frame intermediate the trucks 6 is preferably depressed within a comparatively short distance of the street surface, so as to form a stepless car, this depression extending transversely the entire width of the car. Access from this depressed portion to the end portions of the car may be had by a single step 7. By using truck wheels of relatively small diameter, these steps 7 can be made very low, and their height may still further be reduced by ramping the floor of the end portions, as indicated at 8 in Fig. 6.

The numeral 9 designates the entrance opening and 10 the exit opening. These openings are formed at the central portion of the car, and instead of being closely adjacent to each other, they are separated from each other by a considerable portion of the length of the car side. In a single-deck car, this space between the entrance and exit openings may be utilized as a seating space, a longitudinally extending seat 11 between the two openings being shown in Fig. 7. Preferably, both sides of the car will be provided with these entrance and exit openings, the doors at the side not in use being kept closed, and the space adjacent thereto being occupied by folding seats, such as indicated at 12, in Fig. 7.

The numeral 13 designates doors controlling the entrance opening; 14 the doors controlling the exit opening. These doors may be of any usual or approved character. They may be double-leaf doors, as shown in Figs. 1, 7 and 8, or they may be single-leaf doors, as shown at 10ª and 14ª in Fig. 9.

15 indicates the conductor's station, which is preferably at or near the center of the car between the opposite entrance openings 9.

16 designates, diagrammatically, actuating connections of any suitable character, under the control of the conductor, for controlling the doors 13.

16ª and 17 indicate actuating connections of any suitable character for controlling the exit doors 14, the connection 17 being shown as extending forwardly to the motorman's station at 18. By providing suitable connections 16ª, however, the conductor may be given control of both the doors 13 and 14, which would be necessary when the car is operated as a trailer. Ordinarily, however, for the reasons before stated, I prefer to divide the control between the motorman and the conductor.

As shown in Figs. 8 and 9, if it is desired, both the entrance and exit openings may be divided by a rail 20, so that both the incoming and outgoing passengers can be divided into two streams, and thus further avoid confusion in handling crowds.

In the double-deck form of my invention, the central lower floor space between the entrance and exit doors is utilized for the stairways. In Fig. 1, the upgoing stairway, for instance, is illustrated at 21, and the downgoing stairway at 22. At the side of the car which is not in use, it is possible to provide a seat 23, one end thereof extending underneath the higher end of the stairway. A seat 24 may also be provided at the inner side of the stairway 22. On the upper deck, the floor plan of which is shown in Fig. 2, seats 25 may be provided over the lower ends of the stairways.

My invention lends itself to various arrangements of seats, both on the upper and lower decks. Thus, in the form shown in Figs. 1 and 3, there may be on the lower deck two longitudinally extending seats 26, placed back to back, and facing aisle spaces 27 at opposite sides of the car. With this arrangement of seats on the lower deck, the upper deck will have the central part of the floor of its end portions depressed at 28, as shown in Fig. 3, with the longitudinally extending side seats 29.

In the modification shown in Fig. 5, the seats 30 on the lower deck are at the sides of the car and face a central aisle space 31, while on the upper deck the two longitudinal seats 32 at each end are placed back to back, with the depressed aisle space 33 at each side of the car.

In either of the two arrangements described, it will be seen that the seating spaces on the upper deck are over aisle spaces on the lower deck, while the seating spaces on the lower deck are underneath aisle spaces on the upper deck. In this way, a considerable economy in the total height of the car is effected.

I do not limit myself to any particular arrangement of the seats. Both ends of the car may be as shown in Fig. 3, or as shown in Fig. 5; or one end of the car may have the arrangement shown in Fig. 3 and the other end the arrangement shown in Fig. 5. Various other arrangements of seats, including cross or side arrangements, may also be employed, two of such arrangements being shown in Figs. 8 and 9.

Where the arrangement is such as shown in Fig. 5, the central portion 34 between the two seats may be used to carry a ventilating space or ventilating pipe 35, in the lower deck, these spaces or pipes extending through the roof of the car. To give greater head room above the central portion of the upper deck above the stairs, the central portion of the car roof may be elevated, as shown at 36, in Fig. 6, the trolley or trolleys 37 being mounted on the lower end portions of the car roof. If preferred, in single-deck cars, the exit doors may be placed at the front end of the cars, near the motorman, as shown in Fig. 9.

It will be seen that my invention provides a car having the various advantages before stated, whereby a maximum seating capacity can be obtained with a minimum of confusion or interference between the incoming and outgoing passengers. In some cases, it may be desired to reverse the entrance and exit openings, the openings 10 constituting the entrance, while the openings 9 constitute the exit. In this case, the conductor's station will, of course, be correspondingly changed to a point opposite the openings 10. In single-end cars of the single-deck type, the entrance and exit openings at one side of the car may, of course, be omitted, and the entire space along this side of the car at its central portion be utilized for seats.

In order to better control the passengers of a double-deck car, the motorman's station may be placed on the upper deck, if so desired, in which case, the car-controlling mechanism may be located at 18ª of Fig. 2. In some cases, it may be found desirable to place the exit opening adjacent to the motorman's station, in order to further separate the entrance and exit openings. This arrangement is shown in Fig. 9, in which 9ª indicates the entrance and 10ª the exit. The entrance 9ª is located at or near the central portion of the car.

My invention is also susceptible of various other modifications within the scope of the appended claims.

I claim:

1. A double deck passenger car having an inclosed lower floor extending from end to end of the car, special low swiveled trucks beneath the end portions of the car body and its floor, said body extending beyond the trucks and having a side door opening leading into the car body, the said body having a dropped frame portion extending below said opening, a door for closing said opening, a step portion within the car body at said opening, the said low trucks and the dropped portion of the frame coöperating to bring said step portion only one step above the level of the track and the lower floor not more than one step above said step portion, an upper deck, and a stairway rising from the said dropped portion to the upper deck; substantially as described.

2. A passenger car having side entrance and exit openings arranged at the central portion of the car, but separated from each other by a considerable portion of the car side, doors controlling said openings, and means whereby the exit doors may be controlled from one point on a car and the entrance doors from a different point, substantially as described.

3. A passenger car having side entrance and exit openings arranged at the central portion of the car, but separated from each other by a considerable portion of the car side, doors controlling said openings, and actuating connections for one set of doors extending to a conductor's station, and actuating connections for the other set of doors extending to a motorman's station, substantially as described.

4. A double deck passenger car having centrally arranged side entrance and exit openings, and a stairway at each side of the car in the portion thereof between said openings, the two stairways being oppositely inclined; substantially as described.

5. A double deck passenger car, having separated exit and entrance openings in the side of the car, and a stairway at each side of the car in the portion thereof between the said openings, said stairways being separated from each other by a longitudinal aisle space affording passage from one end portion of the car to the other; substantially as described.

6. A double deck passenger car, having separated exit and entrance openings in the side of the car, and a stairway at each side of the car in the portion thereof between the said openings, said stairways being separated from each other by a longitudinal aisle space affording passage from one end portion of the car to the other, and the two stairways being inclined oppositely to each other; substantially as described.

7. A double deck passenger car having separated side entrance and exit openings, and a longitudinally extending stairway at each side of that portion of the car between said openings, said stairways being parallel with the sides of the car and being separated on the lower deck by a free longitudinal aisle space, and there being a conductor's station adjacent to the foot of one of the stairways; substantially as described.

8. A double deck car, having end seating spaces on the lower deck separated from each other by a central portion which is depressed below the level of the end seating spaces, and the car having a side entrance and a side exit opening at opposite ends of the depressed portion, together with stairways rising from said depressed portion, between the exit and entrance openings, and leading to the upper deck; substantially as described.

9. A double deck car, having end seating spaces on the lower deck separated from each other by a central portion which is depressed below the level of the end seating spaces, and the car having a side entrance and a side exit opening at opposite ends of the depressed portion, together with two oppositely inclined stairways rising from said depressed portion between the said openings and separated from each other by a longitudinal aisle space; substantially as described.

10. A double deck passenger car having the central portion in its lower floor depressed with entrance and exit openings at the opposite ends of the depressed portion, and stairways intermediate the entrance and exit openings, substantially as described.

11. A double deck passenger car having separated side entrance and exit openings at the central portion of the car, a stairway at each side of the car between the entrance and exit openings, a seat on the lower deck under a stairway, and a seat on the upper deck extending over a stairway, substantially as described.

12. A double deck car having a depressed central portion with side openings at the opposite ends thereof, and a stairway located between said openings, and the roof portion of the car above the stairway being elevated above the level of the end portions of the car roof, substantially as described.

13. A double-deck passenger car having a depressed central entrance and stairway space on the lower floor, a corresponding space on the upper floor into which the stairways open, and an end seating space at both ends of the car on both the upper and lower decks, together with two oppositely inclined stairways rising from the respective ends of said depressed portion and at opposite sides of the car, substantially as described.

14. A double deck car, having the central portion of its lower floor depressed below the level of its end portions, with an entrance opening at one end of the depressed portion and an exit opening at the opposite end thereof, a stairway at each side of the car and rising from the depressed portion thereof, and the roof of the car over the top landings of the stairways being raised above the height of the end portions of said roof; substantially as described.

15. A passenger car having the central portion of its floor depressed below the level of the end portion thereof, with an entrance opening at one end of the depressed portion and an exit opening at the opposite end thereof, doors controlling said openings, and control connections for the exit doors leading to one operating station, and the other connections for the other set of doors leading to another station; substantially as described.

In testimony whereof, I have hereunto set my hand.

PEARL N. JONES.

Witnesses:
G. M. VIERS,
H. M. CORWIN.